United States Patent
Downum et al.

(10) Patent No.: US 11,886,886 B2
(45) Date of Patent: Jan. 30, 2024

(54) SYSTEM AND METHOD FOR RUNTIME SYNCHRONIZATION AND AUTHENTICATION OF PRE-BOOT DEVICE DRIVERS FOR A RESCUE OPERATING SYSTEM

(71) Applicant: DELL PRODUCTS, LP, Round Rock, TX (US)

(72) Inventors: Steven Downum, Pflugerville, TX (US); Ibrahim Sayyed, Georgetown, TX (US); Purushothama Malluru, Round Rock, TX (US); Danilo Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 16/780,627

(22) Filed: Feb. 3, 2020

(65) Prior Publication Data

US 2021/0240491 A1 Aug. 5, 2021

(51) Int. Cl.
| | |
|---|---|
| G06F 9/4401 | (2018.01) |
| G06F 9/54 | (2006.01) |
| G06Q 10/087 | (2023.01) |
| G06F 21/44 | (2013.01) |
| G06F 11/14 | (2006.01) |
| G06F 11/30 | (2006.01) |
| G06F 8/65 | (2018.01) |
| G06F 21/57 | (2013.01) |

(52) U.S. Cl.
CPC .............. *G06F 9/4411* (2013.01); *G06F 8/65* (2013.01); *G06F 9/4406* (2013.01); *G06F 9/542* (2013.01); *G06F 9/546* (2013.01); *G06F 11/142* (2013.01); *G06F 11/3051* (2013.01); *G06F 21/44* (2013.01); *G06F 21/575* (2013.01); *G06Q 10/087* (2013.01)

(58) Field of Classification Search
CPC ....... G06F 9/4411; G06F 11/3051; G06F 8/65
See application file for complete search history.

(56) References Cited

U.S. PATENT DOCUMENTS

| | | | | |
|---|---|---|---|---|
| 6,922,831 B1 * | 7/2005 | Kroening | .................. | G06F 8/71 |
| | | | | 717/172 |
| 8,171,272 B1 * | 5/2012 | Chester | ................. | G06F 11/004 |
| | | | | 713/1 |
| 9,110,679 B1 * | 8/2015 | Chan | ..................... | G06F 21/572 |

(Continued)

OTHER PUBLICATIONS

Joshi et al., U.S. Appl. No. 16/453,045 entitled 'System and Method for Preboot Device Driver Provisioning for Remotely-Staged Operating System' filed Jun. 26, 2019.

*Primary Examiner* — Paul Yen
(74) *Attorney, Agent, or Firm* — Larson Newman, LLP (57) ABSTRACT

An information handling system downloads device drivers for recovery operation of the information handling system, and subsequently obtains first configuration information associated with each of the device drivers. The system performs an inventory of devices associated with the information handling system that includes obtaining second configuration information associated with each of the devices in the inventory, and compares the first configuration information and the second configuration information. If the particular device driver is missing, then the system downloads the particular device driver prior to boot to a service operating system.

20 Claims, 5 Drawing Sheets

(56) References Cited

U.S. PATENT DOCUMENTS

| | | | |
|---|---|---|---|
| 9,354,898 B1* | 5/2016 | Luttmann | G06F 9/4415 |
| 9,983,862 B2 | 5/2018 | Jana et al. | |
| 10,776,132 B1* | 9/2020 | Joshi | G06F 9/4411 |
| 2003/0097581 A1* | 5/2003 | Zimmer | G06F 9/4411 |
| | | | 726/10 |
| 2010/0192145 A1 | 7/2010 | Liles et al. | |
| 2019/0042368 A1 | 2/2019 | Khatri et al. | |

* cited by examiner

SYSTEM AND METHOD FOR RUNTIME SYNCHRONIZATION AND AUTHENTICATION OF PRE-BOOT DEVICE DRIVERS FOR A RESCUE OPERATING SYSTEM

FIELD OF THE DISCLOSURE

The present disclosure generally relates to information handling systems, and more particularly relates to runtime synchronization and authentication of pre-boot device drivers for a rescue operating system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system downloads device drivers for recovery operation of the information handling system, and subsequently obtains first configuration information associated with each of the device drivers. The system may perform an inventory of devices associated with the information handling system that includes obtaining second configuration information associated with each of the devices in the inventory, and compare the first configuration information and the second configuration information. If the particular device driver is missing, then the system downloads the particular device driver prior to boot to a service operating system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
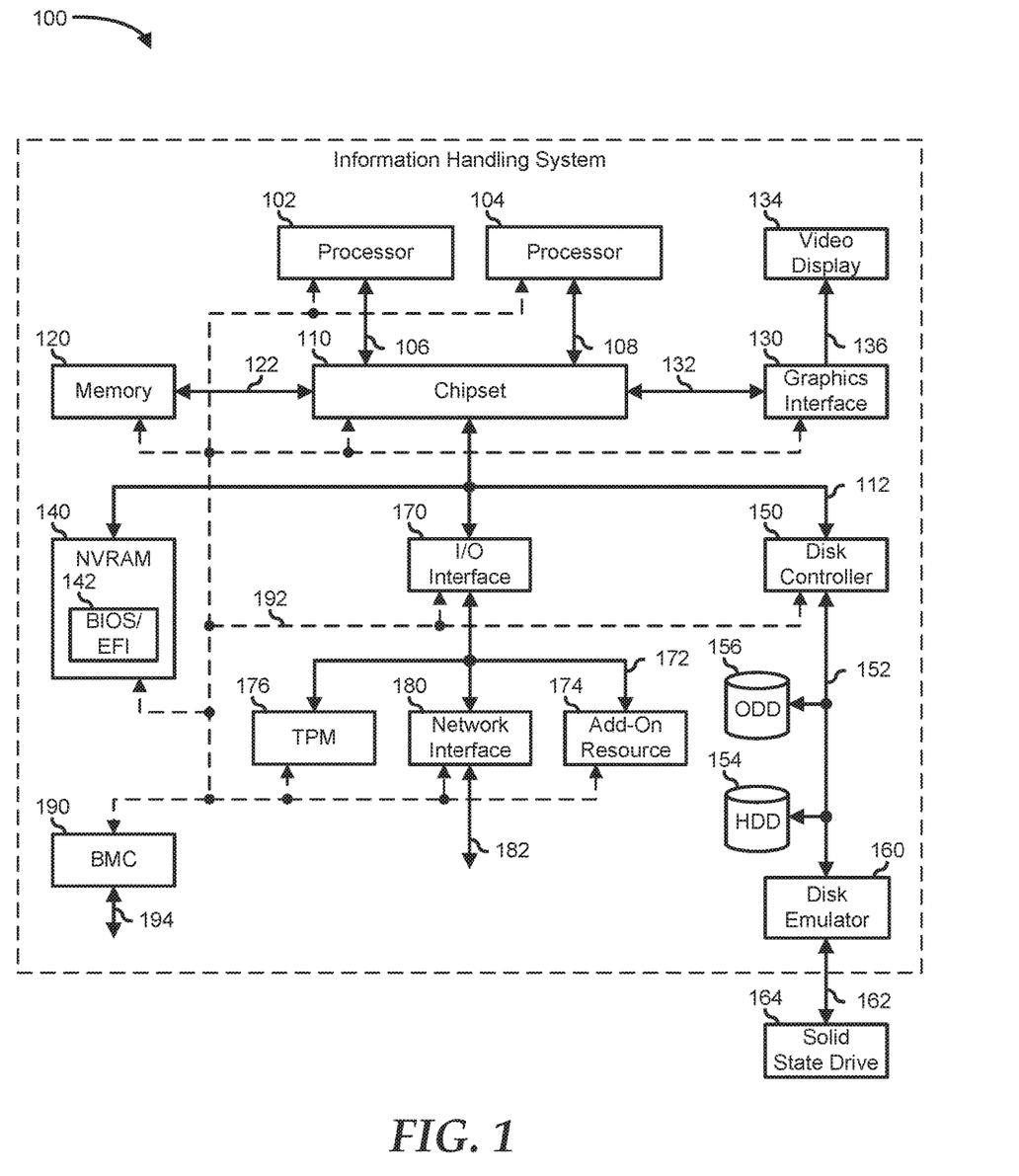
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system (OS) execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Maintenance of an information handling system may require recovery of the OS that repairs or restores the information handling system to an original factory condition. Typically, recovery of the OS may be performed from a partition of the hard drive of the information handling system. If the partition is absent, corrupt, or needs repair, an alternative method is to perform the recovery from a manufacturer's website over the internet. However, certain logistical challenges arise when remotely recovering the information handling system.

Currently, a custom service OS with device drivers and applications for each of the different models of the information handling systems is generated. The device drivers such as storage, network interface card, video driver, etc. applicable for specific for the model of the information handling system may be bundled together in a driver package to support the installation of the service OS. This may be an issue when the current configuration of the information handling system has changed from the initial configuration of the information handling system when it was shipped from the manufacturer. For example, a customer may have changed and/or upgraded a hardware component or device.

Because the device driver in the downloaded driver package may not be compatible with the current device in the information handling system, the OS recovery of the information may fail. In addition, the service OS may not be compatible with the device drivers in the driver package. For example, the service OS may be retrieved from one distribution center and the driver package may be retrieved from another distribution center, such as an update service of an original equipment manufacturer for the device. In another example, the service OS may have been updated while the driver package includes older versions of the device drivers. These incompatibilities and/or lack of synchronization between the device drivers required for the devices of the information handling system and what is included with the service OS may result in a failure during recovery.

The current disclosure addresses the above issues among others by performing a runtime hardware scan of the devices associated with the information handling system during the recovery. If the current configuration of the information handling system does not match the configuration of the information handling system at the point of sale or the configuration of the device drivers in the driver package, then the current disclosure determines whether a device driver that is compatible with the current configuration is available for download. The current disclosure may also verify the authenticity of device drivers prior to providing them to the service OS for loading such as verifying the signatures of the device drivers. This provides an added level of stability due to the addition of pre-boot security checks with the pre-boot sanity checks of the downloaded device drivers ensuring that no device driver is delivered to the information handling system that is not authentic, such as does not have the correct signature.

Figure 2:
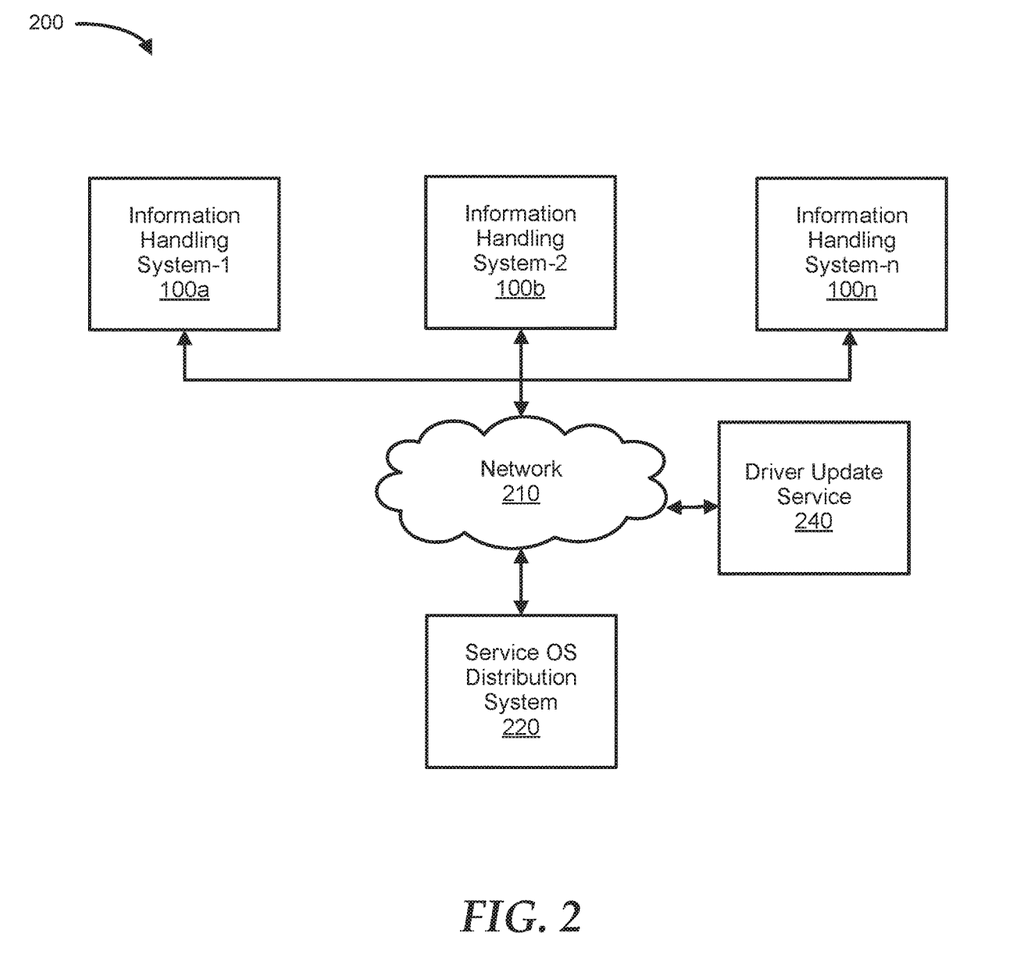
FIG. 2 is a block diagram of an embodiment of a computer system for runtime synchronization and authentication of pre-boot device drivers for a rescue operating system, according to at least one embodiment of the present disclosure.

FIG. 2 shows a computer system 200 for runtime synchronization and authentication of the pre-boot device drivers for the rescue OS also referred to as a service OS. Computer system 200 includes a service OS distribution system 220 connected to information handling systems 100a-100n through a network 210. Computer system 200 may also include a driver update service 240 connected through the same network.

Service OS distribution system 220 may be a web service configured to include, manage and maintain a data store or a library that includes service OS base images, device drivers, device driver packages, OS components, and/or applications. A device driver package may include one more device drivers. The service OS base image provides a building block for commonly selected OS and applications for use with commonly used components. Device drivers may constitute software that acts as an interface between hardware and the OS, application, or another higher-level program. The device drivers may communicate with the hardware over a communications bus and may receive calls from the application or higher-level program and issue commands to the hardware in response to the commands.

Service OS distribution system 220 may include one or more interconnected service OS distribution systems. Each of the interconnected service OS distribution systems may be resources included in an embodiment of the computer system 200 to provide service OS distribution services to, for example, information handling systems 100a-100n. Other embodiments of service OS distribution system 220 are possible and are intended to fall within the scope of the disclosure.

In this embodiment of computer system 200, the N information handling systems 100a-100n may access service OS distribution system 220, for example, in performing recovery operations through network 210. The processors included in information handling systems 100a-100n may be any one of a variety of proprietary or commercially available single or multi-processor system, such as an Intel®-based processor, or another type of commercially available processor able to support traffic in accordance with each particular embodiment and application. Each of information handling systems 100a-100n and the service OS distribution system 220 may all be located at the same physical site or may be in different physical locations. One of information handling systems 100a-100n may issue a request to the service OS distribution system 220 for a rescue or service OS for a recovery operation. For example, a BIOS executing on one of information handling systems 100a-100n may send a request to service OS distribution system 220 to locate service OS base image and its drivers. Service OS distribution system 220 may interact with information handling systems 100a-100n to identify, locate, and download service OS base images along with one or more device drivers or driver packages. Service OS distribution system 220 may accept one or more parameters such as a service tag, manufacturer name, model name or identifier, etc. The server may use the parameter(s) to identify and locate the service OS base image and device driver and/or device driver package.

Service OS distribution system 220 may be connected to information handling systems 100a-100n via network 210. The connection allows the information handling systems to perform serviceability and/or manageability operations. For example, the connection allows information handling system 100a to perform recovery tasks upon a boot failure by downloading the service OS from a web service such as service OS distribution system 220. Service OS distribution system 220 may be remotely accessed via an interface. For example, a user or a program may remotely access service OS distribution system 220. The user or program interaction via the interface may be managed through a server that may include a security subsystem or firewall to restrict unauthorized access. Service OS distribution system 220 may present information in the interface formatted for use by a web browser, such as hypertext markup language (HTML) pages.

Driver update service 240 may be a web service configured to include, manage and maintain a data store or a library that includes device drivers, device driver packages, OS components, and/or applications. Generally, driver update service 240 may be configured to update the device drivers of an information handling system when a new device driver is posted, published, or distributed on the driver update service 240. Driver update service 240 may also be configured to provide device driver package associated with the service OS provided by the service OS distribution system 220.

Network 210 may use any one or more of a variety of networks or another type of communication connection as known to those skilled in the art. The type of communication connection used may vary with certain system parameters and requirements, such as those related to bandwidth and throughput required in accordance with a rate of data requests as may be issued by information handling systems 100a-100n. The communication connection may be a network connection, bus, and/or another type of data link, such as a hardwire connection, a network cable, wireless or Wi-Fi protocols, or other connections known in the art.

Figure 3:
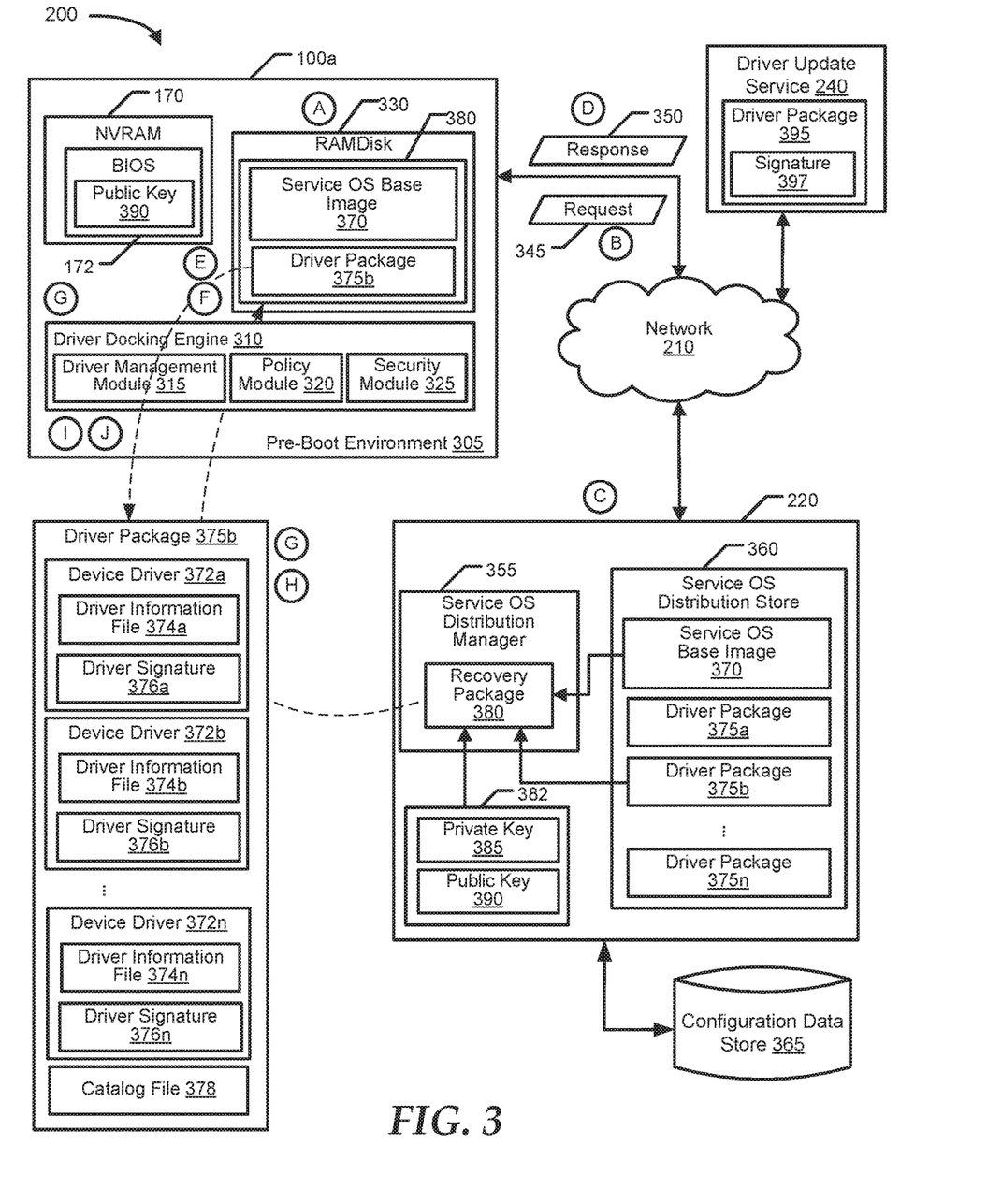
FIG. 3 is a more detailed illustration of the computer system for runtime synchronization and authentication of the pre-boot device drivers for a rescue operating system (OS), according to at least one embodiment of the present disclosure.

FIG. 3 shows computer system 200 in greater detail. Computer system 200 includes service OS distribution system 220 and information handling system 100a connected through network 210. Computer system 200 may also include driver update service 240 which includes a driver package 395 and a digital signature 397. Information handling system 100a includes a pre-boot environment 305 which includes NV-RAM 170, a dynamic RAM disk (RAMDisk) 330, and a pre-boot driver docking engine 310. NV-RAM 170 includes BIOS 172, and a public key 390. Pre-boot driver docking engine 310 includes a driver management module 315, a policy module 320, and a security module 325. Service OS distribution system 220 includes a service OS distribution manager 355, a service OS distribution store 360, and a secure vault 382. Service OS distribution store 360 includes device driver packages 375a-

375n and service OS base image 370. Secure vault 382 includes a private key 385 and public key 390. Service OS distribution system 220 is communicatively coupled to a configuration data store 365.

Information handling system 100a may be a bare-metal information handling system that has an OS that is not bootable. Information handling system 100a may be with or without a main storage such as an HDD or a solid-state drive (SDD). The HDD or the SDD may have been formatted or reformatted. The bare-metal information handling system 100a may also have no host OS to boot from such as may be provided from the factory or assembly plant with no host OS yet installed. A bare-metal information handling system may also be, for example, a decommissioned system in which all firmware and user data, applications and the host OS have been removed such as by a secure delete from the system drives. In addition, the bare-metal information handling system may have different hardware components than when purchased from the manufacturer. For example, one of the hardware components may have been replaced and/or upgraded.

Pre-boot driver docking engine 310 may provide docking services for the device drivers prior to its usage. In this regard, pre-boot docking engine 310 may be configured to synchronize, validate, and/or authenticate device drivers 372a-372b in real-time before providing them to the service OS during the recovery process. Pre-boot driver docking engine 310 may thus be validating the device drivers prior to providing them to the service OS, ensures stability and security of information handling system 100a while recovering. Otherwise, information handling system 100a may not recover correctly or could experience a catastrophic driver-level failure when the service OS repairs and/or recovers information handling system 100a. Information handling system 100a may in addition or instead could experience a security compromise due to compromised device drivers being loaded by the service OS. Validating the device drivers includes authenticating the device drivers, verifying that the correct device drivers are going to be provided to the service OS and that there are no missing device drivers based on the current configuration of information handling system 100a. Thus, it is important to have a real-time device inventory of the components of information handling system 100a and making a transaction call to a backend to get the correct driver package based on the configuration information of the inventoried devices. Verifying that the correct device drivers are provided to the service OS and that there are no missing device drivers may be performed by driver management module 315. Authenticating the device drivers may be performed by security module 325.

For purposes of this disclosure, extensible firmware interface (EFI) and unified EFI (UEFI) are used interchangeably and called UEFI for simplicity. Also, as used herein, legacy BIOS, as well as UEFI BIOS, are referred to as BIOS for simplicity. Pre-boot environment 305 may be configured with an interface that allows information handling system 100a to have access to service OS distribution system 220 and driver update service 240 via network 210. In particular, BIOS 172, a UEFI module, or something similar in a pre-boot environment may access service OS distribution system 220 and driver update service 240.

Service OS distribution system 220 may be configured to store, identify and transmit service OS base image 370 and one or more of driver packages 375a-375n. In particular, service OS distribution store 360 may store various service OS images, device drivers, device driver packages, applications, OS components, etc. that may be used during the recovery operation of information handling systems such as information handling system 100a. The service OS images, device drivers, device driver packages, applications may be stored as compressed files, such as a ZIP file format. In addition, service OS distribution manager 355 may identify the service OS base image 370 and determine the device drivers for information handling system 100a. Service OS distribution manager 355 may use configuration information associated with information handling system 100a included in a request 345 to determine the device drivers specific to information handling system 100a. For example, request 345 may include a service tag associated with information handling system 100a. Request 345 may include other information that service OS distribution system 220 may use to transmit a response 350 such as an internet protocol address, a media access control (MAC) address, etc. In another embodiment, request 345 may include a manifest file.

In one embodiment, service OS distribution store 360 stores a service OS base image 370 and driver packages 375a-375n. Service OS base image 370 does not contain a full OS and may be smaller in size than a typical service OS image. Service OS base image 370 may include code to boot information handling system 100a into a recovery stage. During the recovery stage, the service OS may update its device drivers using the device drivers in RAMDisk 330.

In another embodiment, service OS distribution store 360 stores service OS base images and device drivers for various components of the information handling systems. Upon receipt of request 345, service OS distribution system 220 queries configuration data store 365 for the components associated with information handling system 100a at the point of its purchase. Service OS distribution system 220 then determines the device drivers associated with information handling system 100a based on the result of the query. Service OS distribution system 220 packages the device drivers into a device driver package, such as device driver package 375b which is then included in recovery package 380.

Secure vault 382 represents a storage device that is configured to provide cryptographically secured information, including passwords, data, encryption keys, code, or other information that requires a high root of trust. In a particular embodiment, secure vault 382 represents security storage capacity that is in conformation with a Trusted Platform Module specification organization for standard/international electrotechnical commission (ISO/IEC) 1189. Service OS distribution system 220 may sign response 350 and/or its contents such as recovery package 380 prior to transmission using private key 385. Information handling system 100a may use public key 390 to verify authenticity and integrity of response 350 and/or its contents. In particular, information handling system 100a may verify response 350 using a pinned public certificate before trusting the contents of response 350. The public key 390 may be packaged as part of BIOS in information handling system 100a. In addition to private key 385 and public key 390, secure vault 382 may include a white list. Whitelists may specify which of the service OS distribution systems are permitted to communicate with the information handling system.

Configuration data store 365 may include information regarding the components of the information handling systems such as hardware, software, and services at the point of sale. The information may include the computer model, shipping date, country of purchase, part numbers of the hardware components, license numbers of the software purchased and/or installed services. Configuration data store 365 may also include warranty information associated with the information handling systems and/or its components. As such, changes to the components information handling system based on the inventory list and/or catalog file of missing device drivers is important.

For example, when BIOS 172 performs pre-boot diagnostics prior to booting to service OS, information handling system 100a, BIOS 172 or pre-boot driver docking engine 310, may send the service tag and/or system identifier of information handling system 100a to the backend server such as service OS distribution system 220. The backend server responds by sending a system configuration manifest file that includes the purchase date of information handling system 100a and its system configuration layout based on the purchase order. The system configuration layout includes the devices or components of information handling system 100a at the time of purchase.

Upon receipt of the response, BIOS 172 generates a snapshot of the system configuration of information handling system 100a by scanning the devices included in the information handling system 100a such as hard disk, RAM, wireless cards, battery, graphics card, etc. BIOS 172 verifies the received system configuration layout by comparing it with the generated snapshot of the system configuration of information handling system 100a. The generated snapshot may include configuration information such as device identifier, vendor identifier, publisher, etc. If there is a difference or delta between the two configuration information, BIOS 172 may send the telemetry to the backend server such as service OS distribution system for logging. In addition to the delta, the telemetry may include details regarding the delta and/or information handling system 100a such as current date, purchase date of information handling system 100a. This information may be helpful to a customer care professional to address warranty issues if any.

Pre-boot driver docking engine 310 may be configured to verify and/or authenticate the device drivers prior to providing them to the service OS. In particular, driver management module 315 may verify the configuration information such as device identifier, vendor identifier, and publisher of each of device drivers 372a-372n to ensure that these device drivers are compatible with the devices associated with the motherboard of information handling system 100a and that the device drivers are from a trusted source. The driver management module may read the device driver identifier and vendor identifier from driver information files 374a-374n. In this example, each device driver is associated with its driver information file such as a setup information file (INF) file by Microsoft®. In addition, security module 325 may perform the authentication of each of device drivers 372a-372b by verifying digital signatures 376a-376n. Security module 325 may also perform the authentication using the thumbprints associated with the device drivers in catalog file 378.

Pre-boot driver docking engine 310 may be expandable beyond the checks outlined above. Additional information handling system recovery intelligence to pre-boot driver docking engine 310 can be added creating a platform to expand the abilities of the auto-recovery feature of the information handling system, such as BIOSConnect. As such, pre-boot driver docking engine 310 allows customer-specific service offering for recovery, tailored at the enterprise's or customer's request. Specific customers may have their pre-boot docking requirements for OS recovery to address their specific needs. Policy module 320 may be configured to provide other validation or checks to service OS and/or device drivers as defined by an administrator. For example, the administrator may add that the device drivers be downloaded from a whitelist of update services.

In addition, the administrator may restrict the download of device drivers from a blacklist of update services. Further, pre-boot driver docking engine 310 may be configured to log events or messages which include errors during the verification, authentication, and/or validation of the device drivers and/or service OS. Finally, pre-boot driver docking engine 310 may be configured to generate reports, metrics, and telemetry data collection. For example, the driver docking engine may send a delta report based on the comparison of the configuration information of the unpacked device drivers and the configuration information from the inventory. The delta report may include a system configuration manifest with real-time inventory data. This may be used to offer the right remediation device warranties by a customer service representative when looking at the information handling system's manifest that includes real-time inventory data.

For illustration purposes, information handling system 100a is referred to in the following paragraphs. Each of the stages in the following paragraphs may be performed by BIOS 172 and/or pre-boot driver docking engine 310. However, it is understood that the current disclosure is not limited to information handling system 100a but instead is applicable to any one of information handling systems 100a-100n in FIG. 1. FIG. 3 is annotated with a series of letters A-J. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage A, information handling system 100a begins a sequence of initialization procedures also referred to as an initialization sequence. During the initialization sequence, information handling system 100a may detect an initialization failure or a boot failure. Information handling system 100a may be placed into a service or recovery mode prior to initiating a connection to service OS distribution system 220. The connection initiated may be an out-of-band (OOB) network connection or an in-band network connection. The OOB network connection may be established using an OOB management controller. In another example, the OB network connection may be established using an OOB network interface controller (NIC). The network connection to information handling system 100a may be initiated during a network boot such as a pre-boot execution (PXE) boot. The PXE boot is one of several network boot options that allow the BIOS and a network interface card (NIC) to bootstrap a computer via the network. Other network boot options may be used instead of the PXE boot option such as a Hypertext Transfer Protocol (HTTP) boot option.

At stage A, after detecting the boot failure, information handling system 100a or in particular BIOS 172, may allocate a portion of memory such as memory 104 to be used to hold or for storage of a recovery package 380 which includes service OS base image 370 and driver package 375. In another example, the portion of the memory may be used to hold service OS base image 370 or driver package 375. In another example, BIOS 172 may allocate the portion of the memory upon a subsequent reboot after detecting an initial boot failure. In yet another example, BIOS 172 may allocate the portion of the memory after power is turned on after power off with the initial boot failure. The portion of the memory allocated may be referred to as a dynamic memory disk or a RAMDisk. BIOS 172 may use UEFI variables to store size and location of the RAMDisk 330, such as a start address. The size and location of RAMDisk 330 may also be stored in another data structure such as a BIOS table, advanced configuration, and power interface (ACPI) table, etc. RAMDisk 330 may be a portion of a volatile or non-volatile memory space such as NV-RAM 170. The size of RAMDisk 330 may vary depending on the size of the memory. For example, RAMDisk 330 may be 500 MB on a system with 4 GB RAM. In another example, 2 GB could be allocated for RAMDisk 330 if the system has 16 GB of RAM. RAMDisk 330 may be persistent storage in the pre-boot environment 305 and configured to be accessible by service OS base image 370 during the recovery stage. RAMDisk 330 may be configured to hold the service OS base image 370, driver package 375b, and/or device drivers 372a-372n.

At stage B, information handling system 100a may issue a command or request 345. In particular, the command may be issued during a phase in the initialization sequence such as during a pre-EFI initialization phase (PEI) or a driver execution environment phase (DXE). In one example, request 345 may be an HTTP(S) GET/POST request structured as a representational state transfer/simple object access protocol (RESTful/SOAP) web service request. Request 345 may include name/value pairs and an identifier such as a service tag, a service code, serial number, etc. The service tag is an alphanumeric character code that is used to identify specific information regarding information handling system 100a. For example, the service tag may identify specific components and/or devices of information handling system 100a.

At stage C, service OS distribution manager 355 receives and processes request 345. When service OS distribution manager 355 receives request 345, it identifies a service OS base image such as service OS base image 370 and device drivers or device driver package, such as driver package 375b associated with information handling system 100a, based on the identifier included in request 345. Driver package 375b includes at least one device driver for a device or component in information handling system 100a. In another embodiment, service OS distribution manager 355 may query configuration data store 365 to determine the service OS, components, and/or device drivers associated with information handling system 100a.

At stage D, service OS distribution manager 355 transmits response 350 to information handling system 100a. Response 350 may include information on how to download service OS base image 370, one of driver packages 375a-375n such as driver package 375b from service OS distribution store 360. In another example, response 350 may include a payload, that is service OS base image 370 and one of driver packages 375a-375n such as driver package 375b. In yet another example, the payload may be recovery package 380. Recovery package 380 includes service OS base image 370 and one of driver packages 375a-375n such as driver package 375b. Response 350 may be an HTTP response or HTTP secure (HTTPS) response. Because a compressed package may be faster to download and take up less disk space, service OS base image 370 and driver packages 375a-375n may be stored as compressed files. In another embodiment, service OS base image 370, driver packages 375a-375n, and/or recovery package 380 may be compressed prior to transmission with response 350 to reduce the size of the payload. Additionally, compression of recovery package 380 and/or can obfuscate the instructions making it harder to detect and analyze. In another embodiment, service OS base image 370 and driver package 375b may be compressed prior to their being combined to generate recovery package 380.

Prior to transmitting response 350, service OS distribution manager 355 may generate a signature for response 350 using a private key. The private key is stored in the secure vault in service OS distribution system 220. The public key for the private key is shared with information handling system 100a including pre-boot environment 305. The signature may be packaged as a response header in response 350. The private, public key pair used in service OS distribution system 220 is a pinned certificate that clients such as the information handling systems 100a-100n may use to authenticate instances of response 350.

At stage E, information handling system 100a receives response 350. Information handling system 100a extracts the signature from response 350 and verifies the signature using the public key corresponding to the private key (also referred to as the pinned certificate) that was used to sign the response payload. If the verification passes, information handling system 100a continues with the remaining steps. Otherwise, the process is aborted. Information handling system 100a may parse response 350 and determine how to download service OS base image 370 and the device drivers. After determining how to download service OS base image 370 and the device drivers, information handling system 100a may download service OS base image 370, driver package 375b, and an OS component. In another embodiment, information handling system 100a may download the payload included in response 350. After the download, information handling system 100a may determine the authenticity of the files in the payload such as recovery package 380 and/or service OS base image 370 and driver package 375b prior to its storage in RAMDisk 330. Information handling system 100a may perform the integrity checks of downloaded files, which is recovery package 380 and/or service OS base image 370 and driver package 375b, by matching secure hash algorithm 256 (SHA256) hash of downloaded files against the signature associated with the aforementioned files in response 350.

At stage F, after determining the authenticity of recovery package 380 and/or service OS base image 370 and driver package 375b, information handling system 100a may store recovery package 380 and/or service OS base image 370 and driver package 375b in RAMDisk 330. In particular, BIOS 172 may unpack recovery package 380 and/or service OS base image 370 and driver package 375b prior to storage. BIOS 172 may also separate recovery package 380 into service OS base image 370 and driver package 375b prior to storage. BIOS 172 may then store service OS base image 370 and driver package 375b in RAMDisk 330. The unpacking can continue until service OS base image 370 and driver package 375b are suitable for execution.

At stage G, information handling system 100a, in particular BIOS 172 may verify the authenticity of each device driver in driver package 375b such as device driver 372a-372n. In one embodiment, information handling system 100a may use a catalog file to authenticate the device drivers 372a-372n. A digitally signed catalog file also referred to as a .cat file, can be used as a digital signature for the device drivers 372a-372n in driver package 375a. The catalog file includes a collection of cryptographic hashes, where each of the cryptographic hash corresponds to one of device drivers 372a-372n. The digital signature may be considered invalid if any of device driver 372a-372b is altered after driver package 375b was signed.

In another embodiment, information handling system 100*a* may perform a pre-boot signature check of each one of the signatures in device drivers 372*a*-372*n*, ensuring that each device driver is delivered to a target system, such as information handling system 100*a*, have the correct signature. The pre-boot check may include verifying the public key corresponding to the private key that was used to sign each device driver. If the verification passes, information handling system 100*a* may continue to perform the next stages. Otherwise, the process may be aborted.

At stage H, information handling system 100*a*, in particular BIOS 172 may determine configuration information such as the vendor identifier, device driver identifier, or the like associated with each device driver in driver package 375*b* such as device drivers 372*a*-372*n*. Information handling system 100*a* may parse the driver information file associated with each device driver, such as driver information file 374*a*-374*n*, to determine the configuration information. Information handling system 100*a* may generate a report, such as a manifest that shows the configuration information of each device driver.

At stage I, information handling system 100*a* performs a device scan of its components. In particular, BIOS 172 performs a device scan of all motherboard devices, such as a peripheral component interconnect (PCI) scan, and generates a runtime inventory list of the devices that includes information regarding each of the devices such as device identifier, vendor identifier, device name, device driver version, etc. Information handling system 100*a* may then compare the generated report in stage H and the runtime inventory list to identify any discrepancy between the two reports. In particular, information handling system 100*a* compares the device identifiers and vendor identifiers between the two reports and determines the delta between the two reports if any. Information handling system 100*a* may also generate a delta report and/or missing device drivers report based on the differences between the two reports. In another embodiment, BIOS 172 may direct pre-boot driver docking engine 310 to perform the device scan, to perform the comparison, and to generate the report as aforementioned.

In another embodiment, information handling system 100*a*, in particular BIOS 172 and/or pre-boot driver docking engine 310, reads the device identifier and the vendor identifier in the information file such as an INF file of each of the device drivers 372*a*-372*n* and syncs it with the inventory list. If there is a missing device driver in driver package 375*b*, information handling system 100*a* initiates a new transaction to a backend such as service OS distribution system 220 and/or driver update service 240 to get the missing device driver and/or driver package. This process will be performed for each of the missing device drivers until there is no longer a missing device driver. In yet another embodiment, information handling system 100*a* generates a catalog file based on the missing device drivers. The generated catalog file is then transmitted to the backend to request for a driver package which includes the missing device drivers according to the catalog file.

At stage J, after authenticating, verifying the accuracy of the device drivers, and downloading missing device drivers if any, information handling system 100*a* executes service OS base image 370, mounts RAMDisk 330 to a particular location or virtual device path and loads the device drivers. Information handling system 100*a* provisions or installs the device drivers and/or activates various OS components from the mounted RAMDisk 330. Device drivers that are no longer required by information handling system, based on the current configuration may not be provided to the service OS during the recovery process. In another embodiment, the aforementioned device drivers may be deleted and/or removed from RAMDisk 330.

Driver packages may contain device drivers for the installation of a particular service OS. The device drivers included in a driver package may be based on the OS, the OS version, model and/or type of the information handling system, etc. For example, a computer of a particular model with a Windows OS may require a different driver package than another laptop of the same particular model with a different OS. In another example, a computer with a particular service tag may require a different driver package than another computer with a different service tag even if both computers have the same OS.

While it is shown that service OS distribution system 220 stores both the service OS base images and the driver packages and combines them in the recovery package prior to transmitting to information handling system 100*a*, in another embodiment service OS distribution system 220 may only store the service OS base images. Thus, the recovery package may only include the service OS base image. Information handling system 100*a* may retrieve the device drivers and/or driver packages from a different distribution system or update service such as driver update service 240.

Figure 4:
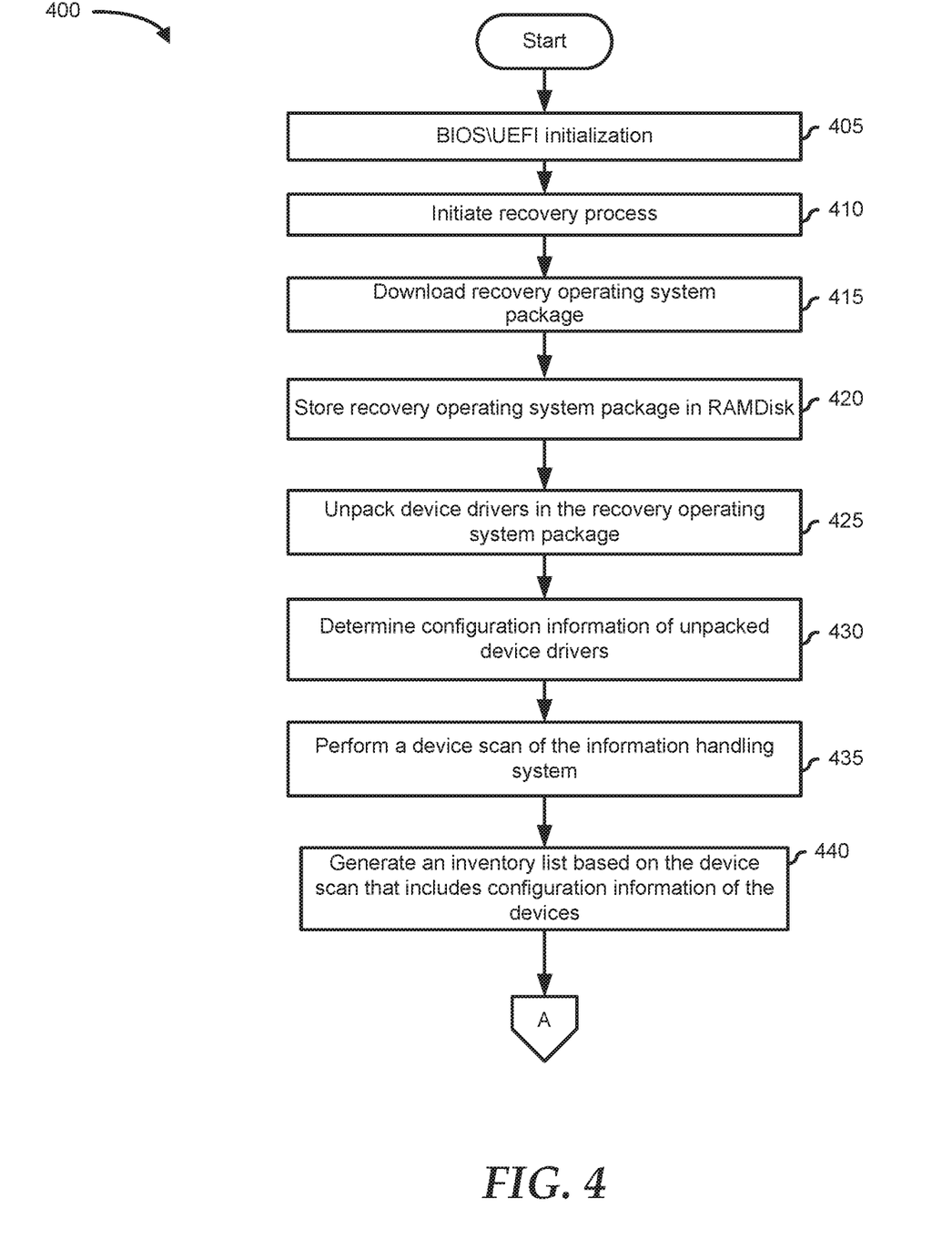
FIG. 4 and FIG. 5 are flow diagrams illustrating an example of a method for runtime synchronization and authentication of the pre-boot device drivers for the rescue OS, according to an embodiment of the present disclosure.

FIG. 4 illustrates a method 400 for runtime synchronization and authentication of the pre-boot device drivers for the rescue OS also referred to as the service OS. Method 400 may be performed by one or more components of FIG. 2 and FIG. 3 such as the BIOS and/or pre-boot driver docking engine or its components. When an information handling system is repaired, the service OS and the device drivers may be downloaded from a remote location by a recovery process such as the BIOSConnect feature of Dell. The service OS loads the device drivers on the target information handling system in order to correctly restore the information handling system. The web or cloud services that deliver the service OS and the web or cloud services that deliver the device drivers may come from different hosting environments. Thus, the downloaded device driver versions could potentially not be in sync with the device driver versions required by the service OS. In addition, the device drivers from cloud services other than the cloud services that hosts the service OS may be compromised. These may cause errors and/or security issues during the repair of the information handling system. Thus, the repair of the information handling system using the downloaded service OS needs a means to synchronize, validate, and/or authenticate the device drivers to ensure system stability and security. Otherwise, the repair of the information handling system may not be successful. For example, the repair could result in a device driver-level failure or the security of the information handling system is compromised because of compromised device drivers being loaded by the service OS from an untrusted source.

Method 400 uses the pre-boot environment as a platform to synchronize, validate, and authenticate the device drivers which includes checking their signatures before providing them to the service OS for loading. This ensures the integrity of the device drivers before the service OS loads them. Method 400 typically starts at block 405 where the information handling system performs UEFI initialization sequence also referred to as a boot sequence. The initialization sequence includes several platform initialization phases such as a security (SEC) phase, the PEI phase, and the DXE phase, wherein each platform initialization phase has its execution environment. Under normal circumstances, the initialization phase is successful and launches the OS such as a Windows® or Linux® OS. However, there are instances that the initialization fails and is unsuccessful in launching the OS. The OS and the BIOS may be configured to monitor and report the successful or unsuccessful launching of the OS. For example, the Windows OS specification provides a Simple Boot Flag (SBF) register to allow the OS to notify the BIOS when a boot failure has occurred. During a subsequent unsuccessful boot sequence, the BIOS can access the SBF register. If the BIOS determines that a prior initialization has failed, the BIOS may start an OS recovery operation. During the OS recovery operation, the BIOS communicates with a backend cloud system. The BIOS may communicate to the backend cloud system using various means such as JavaScript object notation (JSON) over HTTPS as a data transfer protocol.

After the initialization failure, the method begins at block 410, where the method initiates the recovery process which includes determining and establishing connection to the service OS distribution center and/or device drivers update service. In addition, method may create a RAMDisk storage space. The RAMDisk may be volatile or non-volatile memory storage such as embedded and partitioned flash memory, electrically erasable programmable read-only memory (EEPROM), other types of NV-RAM that are configured to store information for the recovery base image and the device drivers. For example, the RAMDisk storage space may be created by allocating a portion of the system memory RAM (SMRAM). In particular, the portion of the SMRAM may be allocated by calling the function EFI_ALLOCATE_POOL. In another embodiment, the method may create a plurality of RAMDisks. For example, the method allocates two portions of the SMRAM, thus creating two RAMDisks. A first RAMDisk is used to store the recovery base image and a second RAMDisk is used to store the device drivers and other files. The method proceeds to block 415.

Prior to block 415, the method may first try to recover the OS using a recovery OS image that resides in a partition of the information handling system's hard drive. If the recovery OS image residing in the partition of the information handling system's hard drive is absent, corrupt, or needs repair, then the method proceeds to block 415. At block 415, the method may initiate a process to download an OS recovery image from a distribution center. For example, a Dell information handling system may initiate the BIOSConnect feature to download the SupportAssist OS recovery image from Dell.com after prompting the user to restart the computer. After downloading the service OS and device drivers, the method proceeds to block 420.

At block 420, the method may store the service OS base image and the driver package in the RAMDisk. In another embodiment, the method may store the service OS base image in one RAMDisk and the driver package in another RAMDisk. After storing the service OS base image and the device drivers, the method proceeds to block 425 where the information handling system or the BIOS in particular unpacks the service OS base image and the driver package. The unpacked content is stored in RAM disk in a format that the OS run time expects. The method then proceeds to block 430 where the method parses each device driver information file to determine configuration information associated with each device driver such as the vendor identifier, device driver identifier, publisher identifier, version, etc. The information handling system may generate a data structure such as a list of the unpacked device drivers. The method proceeds to block 435.

At block 435, the method performs an automated discovery of its hardware components or devices. In particular, the BIOS may make a device scan request on the motherboard to read the device identifier and vendor identifier of all devices in the information handling system such as network cards, sound cards, graphics cards, hard disks, video controller, etc. The device scan request may be performed on the devices associated with a specific bus or a range of busses such as the PCI bus, USB, SPI bus, etc. The device scan may determine device identifiers, vendor identifiers, location of the device, whether the device is a virtual device, etc. The method proceeds to block 440.

At block 440, the information handling system generates an inventory list of the devices that are identified in block 435. The inventory list may include some or all of the determined information about each of the discovered devices. The inventory list may be arranged according to a set preference such as according to each device's identifier, vendor identifier, category, etc. The device identifier may be a unique identifier such as a globally unique identifier (GUID). The method proceeds to block 505 of FIG. 5 which is a continuation of FIG. 4.

Figure 5:
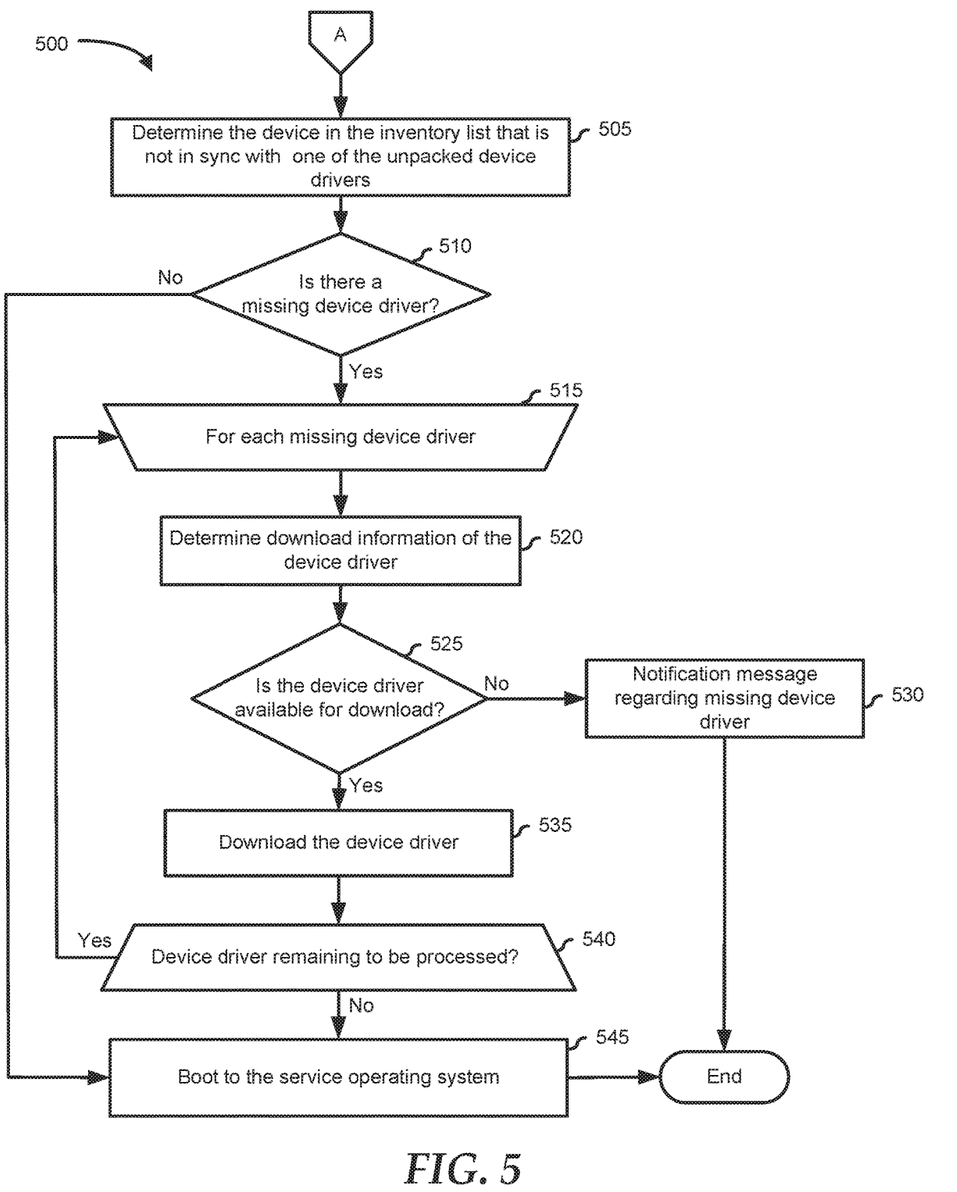

At block 505, the method may compare the configuration information of the downloaded device drivers and the configuration information of the devices in the inventory list and may determine the differences or delta between the two. In particular, the method may determine all of the device drivers for the recovery process based on the comparison that are not in sync with the downloaded device drivers. In other words, the method determines if there is a device in the inventory list that has no associated appropriate device driver. The method may compare the device identifier, vendor identifier, version number, publisher, etc. of the devices in the inventory list with the device identifier, vendor identifier, version number, publisher, etc. of each downloaded device driver. In one embodiment, the method may read the configuration information such as the device identifier and/or the vendor identifier in the INF file of each downloaded device driver. In another embodiment, the method may read the configuration information from a list generated based on the downloaded device driver. Based on the comparison, the method may generate a data structure such as a list of the missing device drivers. The list may include information related to the device such as the device identifier, the vendor identifier, device name, uniform resource locator of the location of the device driver, publisher, etc.

The method proceeds to decision block 510 where a decision is made on whether there is a missing device driver. As used herein, the missing device driver is based on the determination at block 505. In addition to a scenario wherein a device driver of the information handling system based on the inventory list is not one of the downloaded device drivers, the device driver may be marked as missing based on a policy determined by the administrator, such as when the device driver failed a sanity check and/or an authentication check. As used herein, the sanity check includes the synchronization and/or validation with one or more attributes in the configuration information, such as device driver identifier, device identifier, device driver version, publisher, vendor identifier, etc. For example, a device driver may be marked as missing if the unpacked device driver is an older version and an updated version of the device driver is required to boot to the service OS. In another example, a device driver may be marked as missing if the unpacked device driver is from an untrusted and/or blacklisted update service or publisher wherein a device driver from a trusted and/or whitelisted update service or publisher is required to boot to the service OS. If there is a missing device driver, then the "YES" branch of decision block 510 is taken and the method proceeds to block 515. If there is no missing device driver, then the "NO" branch of decision block 510 is taken and the method proceeds to block 545.

At block 515, the processing of the missing device drivers begins. For example, the information handling system may traverse the list of missing device drivers as structured. The information handling system may also rearrange the list based on various factors. For example, the re-arrangement may be based on the device driver identifier, the order of loading by the service OS, etc. The device driver being processing may be referred to as the current device driver. The method proceeds to block 520, where the method determines download information regarding the current device driver. The method may query configuration information in the inventory list of the current devices for the publisher, location of the download URL, vendor identifier etc. The method may query the information handling system's service OS distribution system for the associated device driver based on the device identifier, vendor identifier, publisher, etc. The method may also query the update service of the vendor of the device, the developer of the service OS, a third-party update service, etc.

The method proceeds to decision block 525 where a decision is made whether there is a device driver available for download based on the query in block 520. If there is a device driver available for download, then the "YES" branch of decision block 525 is taken and the method proceeds to block 535. If there is no device driver available for download, then the "NO" branch of decision block 525 is taken and the method proceeds to block 530.

At block 530, a notification message regarding the missing device driver may be generated. The notification may include additional information regarding the missing device driver such as an error code. The notification may also include an impact if any to the recovery of the information handling system. The method may then end the recovery of the information handling system. The notification message may also be logged or transmitted to the manufacturer of the information handling system for debugging purposes. After generating the notification, the method may end. In another embodiment, the information handling system may present the information in an interface to the administrator and/or allow the administrator the option on whether to proceed with the recovery of the information handling system despite the missing device driver. If the administrator decides to continue with the recovery, then the method proceeds to block 540.

At block 535, the method downloads the device driver. The method may send a request such as an API or an HTTP request to download the device driver. The cloud distribution system may respond to the request and include the device driver as a payload. In one embodiment, the cloud distribution system provides information to the BIOS on how to download the recovery OS package. For example, the information may provide the name, size, file path, uniform resource locator (URL), the format of the files to be downloaded, and the download type. After downloading the device driver, the method proceeds to block 540.

At block 540, the method determines whether there is another missing device driver to be processed. If there is a missing device driver to processed, then the "YES" branch of block 540 is taken and the method proceeds to block 515. If there is no missing device driver to be processed, then the "NO" branch of block 540 is taken and the method proceeds to block 545. At block 545, the method boots to the service OS. Booting to the service OS includes performing recovery of the information handling system such as the installation of the service OS and device drivers. After booting to the service OS, the method ends.

Although FIG. 4, and FIG. 5 show example blocks of method 400 and method 500 in some implementation, method 400 and method 500 may include additional blocks, fewer blocks, different blocks, or differently arranged blocks than those depicted in FIG. 4 and FIG. 5. Additionally, or alternatively, two or more of the blocks of method 400 and method 500 may be performed in parallel. For example, block 425 of method 400 and block 435 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for handling instructions in a pre-boot execution environment of an information handling system, the method comprising:
in response to a boot failure, performing operations, by a processor, that include:
creating a random access memory disk storage space by allocating a portion of a random access memory in the pre-boot execution environment for storage of a plurality of device drivers for recovery operation of the information handling system;
downloading and storing in the random access memory disk storage space of the portion of the random access memory, the device drivers for the recovery operation of the information handling system;
generating a first configuration information based on the device drivers that were downloaded and stored in the random access memory disk storage space;
performing a device scan to obtain an inventory of current device drivers of the information handling system, wherein the inventory includes a second configuration information associated with each of the current device drivers in the inventory;
comparing the first configuration information and the second configuration information to determine if there is a discrepancy between the first configuration information and the second configuration information;
in response to determining there is a missing device driver based on the discrepancy and the missing device driver is available for download, downloading the missing device driver prior to booting to a service operating system; and
in response to determining there is a missing device driver based on the discrepancy and the missing device drive is not available for download, generating a message regarding the missing device driver and transmitting the message to a manufacturer of the information handling system, wherein the message includes an impact to the recovery operation of the information handling system.

2. The method of claim 1, wherein the first configuration information includes a first device identifier.

3. The method of claim 1, wherein the second configuration information includes a second device identifier.

4. The method of claim 1, further comprising authenticating the each one of the device drivers prior to obtaining the first configuration information.

5. The method of claim 1, further comprising if there is no missing device driver, then booting the information handling system to the service operating system.

6. The method of claim 1, wherein the information regarding the missing device driver included in the message is presented to an administrator.

7. The method of claim 1, further comprising determining whether the missing device driver is available for download prior to the downloading the missing device driver.

8. The method of claim 7, further comprising in response to the determining that the missing device driver is not available for download, notifying a user of the information handling system regarding the missing device driver.

9. The method of claim 1, wherein the comparing the first configuration information and the second configuration information includes determining whether a first device driver version based on the first configuration information matches a second device driver version based on the second configuration information.

10. An information handling system, comprising:
a pre-boot execution environment; and
a processor coupled to the pre-boot execution environment, the processor configured to:
in response to a boot failure, create a random access memory disk storage space by allocating a portion of a random access memory in the pre-boot execution environment for storage of a plurality of device drivers for recovery operation of the information handling system;
download and store in the random access memory disk storage space of the portion of the random access memory, the device drivers for the recovery operation of the information handling system, wherein the device drivers are based on components of the information handling system at time of purchase of the information handling system;
subsequent to the download and the store of the device drivers, obtain a first inventory of device drivers stored in the random access memory disk storage space, wherein the first inventory includes a first configuration information associated with each of the device drivers;
perform a device scan to obtain a second inventory of current device drivers of the information handling system that includes obtaining a second configuration information associated with each of the device drivers in the second inventory;
compare the first configuration information and the second configuration information;
determine whether a particular device driver is missing based on the comparison of the first configuration information and the second configuration information;
in response to a determination the particular device driver is missing, and the particular missing device driver is available for download, download the particular device driver prior to boot to a service operating system; and
in response to a determination the particular device driver is missing and the particular missing device driver is not available for download, generate a message regarding the missing device driver and transmit the message to a manufacturer of the information handling system, wherein the message includes an impact to the recovery operation of the information handling system.

11. The information handling system of claim 10, further comprising a dynamic memory disk to hold the device drivers.

12. The information handling system of claim 10, wherein the processor is further configured to authenticate a digital signature of each one of the device drivers.

13. The information handling system of claim 10, wherein the first configuration information includes a first vendor identifier and the second configuration information includes a second vendor identifier.

14. A non-transitory computer readable medium storing instructions that when executed cause a processor to:
in response to a boot failure, performing operations that include:

creating a random access memory disk storage space by allocating a portion of a random access memory for storage of a plurality of device drivers for recovery operation of an information handling system;

downloading and storing the device drivers for recovery of the information handling system in the random access memory disk storage space, wherein the device drivers are based on components of the information handling system at time of purchase of the information handling system;

subsequent to the downloading and the storing of the device drivers, obtaining a first inventory of device drivers stored in the random access memory disk storage space, wherein the first inventory includes a first configuration information;

performing a device scan to obtain a second inventory of current device drivers of the information handling system that includes obtaining a second configuration information of the current device drivers in the second inventory;

comparing the first configuration information with the second configuration information;

in response to determining a particular device driver is missing based on the comparison of the first configuration information and the second configuration information and the particular missing device driver is available for download, downloading the missing device driver prior to boot to a service operating system; and in response to determining the particular device driver is missing and the particular missing device driver is not available for download, generating a message regarding the missing device driver and transmitting the message to a manufacturer of the information handling system, wherein the message includes an impact to the recovery operation of the information handling system.

15. The non-transitory computer readable medium of claim 14, wherein the operations further comprise authenticating each one of the device drivers.

16. The non-transitory computer readable medium of claim 15, wherein the operations further comprise failing the recovery when one of the device drivers fails the authentication.

17. The non-transitory computer readable medium of claim 14, wherein the operations further comprise sending a delta report to a service distribution system, wherein the delta report is based on the comparison of the first configuration information and the second configuration information.

18. The non-transitory computer readable medium of claim 17, wherein the delta report includes a system configuration manifest with real-time inventory data.

19. The non-transitory computer readable medium of claim 14, wherein the operations further comprise querying an update service to determine whether the particular device driver is available.

20. The non-transitory computer readable medium of claim 19, wherein the querying is based on the second configuration information.

* * * * *